United States Patent [19]

Obrecht et al.

[11] Patent Number: 5,036,149
[45] Date of Patent: Jul. 30, 1991

[54] PROCESS FOR THE PREPARATION OF ETHYLENE/ACRYLONITRILE COPOLYMERS, NEW ETHYLENE/ACRYLONITRILE COPOLYMERS AND THEIR USE

[75] Inventors: Werner Obrecht, Moers; Szolt Szentivanyi, Tokyo; Hubert Sutter, Leverkusen; Jens Herwig, Cologne; Alois Kolwert, Roesrath, all of Fed. Rep. of Germany

[73] Assignee: Bayer Aktiengesellschaft, Leverkusen, Fed. Rep. of Germany

[21] Appl. No.: 448,504

[22] Filed: Dec. 11, 1989

[30] Foreign Application Priority Data

Dec. 23, 1988 [DE] Fed. Rep. of Germany ....... 3843561

[51] Int. Cl.$^5$ ............................................... C08F 20/10
[52] U.S. Cl. .................................. 526/323.2; 526/342
[58] Field of Search ............................. 526/323.2, 342

[56] References Cited

U.S. PATENT DOCUMENTS

| | | | |
|---|---|---|---|
| 3,755,237 | 8/1973 | Isaacs et al. | 526/331 |
| 4,062,857 | 12/1977 | Kobashi et al. | 526/342 |
| 4,515,931 | 5/1985 | Olson et al. | 526/323.2 |
| 4,803,252 | 2/1989 | Kida et al. | 526/323.2 |

FOREIGN PATENT DOCUMENTS

| | | | |
|---|---|---|---|
| 0064242 | 6/1978 | Japan | 526/323.2 |
| 2059613 | 3/1987 | Japan | 526/323.2 |

*Primary Examiner*—Joseph L. Schofer
*Assistant Examiner*—J. M. Reddick
*Attorney, Agent, or Firm*—Connolly and Hutz

[57] ABSTRACT

Ethylene/acrylonitrile high pressure solvent-free polymers with reduced tackiness may be obtained by the copolymerisation of small quantities of acryloyl or methacryloyl compounds.

1 Claim, No Drawings

PROCESS FOR THE PREPARATION OF ETHYLENE/ACRYLONITRILE COPOLYMERS, NEW ETHYLENE/ACRYLONITRILE COPOLYMERS AND THEIR USE

This invention relates to a process for the preparation of ethylene/acrylonitrile copolymers by high pressure polymerisation, using certain additional comonomers, to new ethylene acrylonitrile copolymers containing copolymerised units of these additional comonomers and to the use of these copolymers as flow improvers, binders for adhesives, mixing components for thermoplasts, rubbers and duroplasts and the preparation of the vulcanisates.

The copolymerisation of ethylene and acrylonitrile by the high pressure process is known (U.S. Pat. No. 3,264,275). The copolymers obtained have a certain tackiness. The tackiness of these products creates problems in their production, in particular in the discharge apparatus and in the process of granulating the products. When tacky granulates are kept in storage, they tend to cake together and the processing of tacky materials gives rise to problems in the dosing and mixing apparatus.

It was therefore an object of the present invention to prepare ethylene/acrylonitrile copolymers of reduced tackiness by the high pressure solvent-free polymerisation process. The copolymers obtained should preferably be substantially free from gelled components.

It was surprisingly found that the problem could be solved according to the invention by the copolymerisation of small quantities of compounds containing at least two acryloyl or methacryloyl groups per molecule. The causal connection between the process according to the invention and the reduced tendency to tackiness is firmly established but has not yet been clarified. It is certain, however, that the reduced tendency to tackiness is not due simply to an increase in molecular weight since copolymerisation of other polyfunctional comonomers generally used for cross-linking and hence for increasing the molecular weight (e.g. divinylbenzene, triallyl cyanurate, diallylphthalate, triallylphosphate) has no significant effect in reducing tackiness.

The present invention thus relates to a process for the preparation of ethylene/acrylonitrile copolymers containing from 10 to 90% by weight, preferably from 20 to 80% by weight of acrylonitrile incorporated by polymerisation, by the solvent-free polymerisation of the monomers by the high pressure process at pressures from 500 to 5000 bar, preferably from 1500 to 3000 bar, characterised in that the polymerisation is carried out in the presence of from 50 ppm to 2% by weight, preferably from 100 ppm to 1% by weight, based on the polymerisable monomers put into the process, of (meth)acryloyl compounds containing at least two acryloyl or methacryloyl groups per molecule.

(Meth)acryloyl compounds which are preferred for the process according to the invention are compounds with molecular weights of from 126 to 1000, preferably from 126 to 500, such as, for example, acrylic acid anhydride, methacrylic acid anhydride and the acrylates and methacrylates of polyhydric, in particular dihydric or trihydric aliphatic, cycloaliphatic, araliphatic or aromatic alcohols containing 2 to 24 carbon atoms per molecule, e.g. acrylates and methacrylates of ethylene glycol, propane-1,2- and -1,3-diol, butane-1,2-, -1,3-, -2,3- and -1,4-diol, neopentyl glycol and hexanediols, in particular hexane-1,6-diol, cyclohexane-1,4-diol, 1,4-bis-(hydroxymethyl)-cyclohexane, hydroquinone, resorcinol, bisphenol-A, ethoxylated bisphenol-A and hydroquinone-di-(β-hydroxyethyl)-ether; also, the acrylates and methacrylates of glycerol, trimethylolethane, trimethylolpropane and phloroglucinol.

Acrylates and methacrylates of polyether polyols are also preferred (meth)acryloyl compounds, especially the acrylates and methacrylates of polyethylene and polypropylene glycols containing 1 to 20, preferably 1 to 12 ether oxygen atoms per molecule; in particular the acrylates and methacrylates of di- and tri-ethylene glycol and of di- and tripropylene glycol.

In addition to the (meth)acryloyl compounds to be used according to the invention, up to 10% by weight of the sum of ethylene and acrylonitrile to be used as monomers may be replaced by other comonomers. Preferred examples of such comonomers include carbon monoxide and especially compounds which, in addition to containing a copolymerisable C=C-double bond, contain a reactive group which is preserved when the monomers are incorporated in the polymer chain and facilitates vulcanization of the resulting copolymer with various vulcanizing agents. Compounds corresponding to the following formula are examples of such comonomers containing reactive groups:

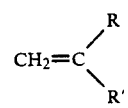

wherein
R denotes H, CH$_3$ or COOH and
R' denotes COOH, CONH$_2$, COOCH$_2$OH,

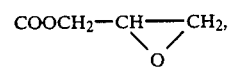

The process according to the invention may be carried out at pressures from 500 to 5000 bar, preferably from 1000 to 3000 bar, and at temperatures from 50° to 450° C., preferably from 120° to 350° C.

The process according to the invention may be initiated by radical forming substances. Suitable polymerisation initiators include those compounds which are also used for high pressure homopolymerisation of ethylene. Examples of suitable initiators include oxygen, preferably used in quantities of from 10 to 1000 mol ppm, based on the monomers to be polymerised. Other preferred polymerisation initiators include azo compounds such as azo-isobutyrodinitrile, peroxides, hydroperoxides and mixtures thereof, but especially mixtures of oxygen and peroxides and/or hydroperoxides. Preferred peroxides and hydroperoxides include tert.-butylperpivalate, di-tert.-butylperoxide, tert.-butyl hydroperoxide, tert.-butyl perbenzoate, dilauroyl peroxide, tert.-butyl perisooctanoate and tert.-butyl perisononanate. Di-tert.-butyl peroxide, tert.-butyl perpivalate and tert.-butyl-perisononanate are particularly suitable peroxides.

The concentration of initiator added is generally from 0.001 to 100 mol-ppm, preferably from 0.1 to 30 mol-ppm, based on the total quantity of monomers subjected to polymerisation. The solvents used for the initiator may be aliphatic hydrocarbons such as octane or petroleum hydrocarbons but other inert solvents may also be used, such as chlorobenzene, cyclohexane or methanol.

The usual regulators, e.g. hydrocarbons such as propane, propene, iso-octane, ketones such as acetone or ethyl methyl ketone and aldehydes such as propionaldehyde also act as molecular weight regulators in the process according to the invention. Such substances are therefore preferably not added. If their use is essential, e.g. as solvents for the initiator or for rinsing the stirrer shafts, then the regulating influence of these compounds may be counteracted by adding larger quantities of the (meth)acryloyl compounds to be used according to the invention or larger quantities of conventional cross-linking agents.

The polymerisation is normally carried out by a continuous process under adiabetic reaction conditions. The reactor used may be a stirrer autoclave or a cascade of such autoclaves. A tube reactor or a combination of a stirrer autoclave and a tube reactor may also be used for carrying out the process according to the invention. A reaction carried out in series with a plurality of stirrer autoclaves is particularly preferred.

The copolymer prepared according to the invention may be worked up by, for example, the following method: After polymerisation, the reaction mixture is transferred to a high pressure product separating zone which is under a pressure of from 100 to 500 bar and a temperature from 150° to 300° C. In this high pressure product separator, the copolymer obtained in the reactor is separated from unpolymerised monomers. The copolymer is transferred from the high pressure product separator to the low pressure product separating zone which is at a pressure below 10 bar.

The resulting product is transferred from the low pressure product separator to a discharge apparatus and is cooled and granulated. The granulator used is preferably an underwater granulator in which the water may contain additives for further reducing the tendency of the granulates to tackiness.

The copolymers prepared according to the invention preferably have gel contents of less than 0.2% by weight, based on the copolymer and determined as insoluble residue after 24 hours' extraction with chlorobenzene in a Soxhlet extractor. Gelatine components can easily be detected qualitatively as a surface roughness on extruded copolymer strands having diameters of from 2 to 5 mm.

The melt flow index (MFI) of the copolymers prepared according to the invention is generally from 0.1 g/10 min (determined at 190° C./2.16 kp) to 100 g/10 min (determined at 120° C./2.16 kp). The number average molecular weights $\overline{M}_n$ of the copolymers is generally in the range of from 15,000 to 200,000, preferably from 22,000 to 70,000 (determined by membrane osmometry in tetrahydrofuran) and their Mooney viscosities according to DIN 53253 are generally from 1 to 120, preferably from 10 to 40 ML (1+4) 100° C.

The copolymers prepared according to the invention are suitable as flow improvers for crude oils and medium fraction distillates (DIN 7728 T1), as hot melt adhesives, for modifying thermoplasts and duroplast, as mixing components for rubbers and for the production of moulded articles such as cables and rubber articles.

When used in mixtures with other polymers, the ethylene/acrylonitrile copolymers prepared according to the invention develop a certain plasticizer action. These "other polymers" may consist, for example, of polyvinyl chloride; polymethyl methacrylate; copolymers of styrene, α-methylstyrene and p-methylstyrene with acrylonitrile, methacrylonitrile, vinyl acetate, acrylates, methacrylates or maleic acid anhydride; polyacrylonitrile; copolymers of acrylonitrile with acrylates, methacrylates or maleic acid anhydride; ABS; polyvinylidene chloride; cellulose esters; polycarbonates; polyamides; polyesters; ethylene and propylene homo- and copolymers; polyphenylene oxide; polyphenylene sulphide; polyvinyl acetate; and polyvinyl alcohol.

The above described ethylene/acrylonitrile copolymers prepared according to the invention are also suitable as mixing components for other rubbers such as rubber-like homo- and copolymers of butadiene, isoprene, chloroprene, acrylonitrile, vinyl acetate, esters of acrylic or methacrylic acid and $C_1$–$C_8$-monohydric or dihydric alcohols; vinylidene vinyl chloride and ethylene.

The copolymers prepared according to the invention are also suitable as mixing components for fluorine rubbers (polymers based on vinylidene fluoride, tetrafluoroethylene, hexafluoropropane and perfluorinated vinyl ethers), for epichlorohydrin homo- and copolymers (in particular for epichlorohydrin copolymers with ethylene oxide and propylene oxide) and for nitrile rubbers.

The ethylene/acrylonitrile copolymers prepared according to the invention may also be used as additives for three-dimensionally cross-linkable polymers such as phenol/formaldehyde resins, urea/formaldehyde resins or unsaturated polyester resins.

When the ethylene/acrylonitrile copolymers prepared according to the invention are required as mixing components, they may be used over a wide range of proportions, e.g. from 1 to 99% by weight, preferably from 10 to 90% by weight, in particular from 10 to 40 and from 60 to 90% by weight, based on the mixture.

When the copolymers prepared according to the invention are to be mixed with other polymers, they may be used either in the cured or in the uncured state. Vulcanization may be carried out by cross-linking with peroxides or with polyfunctional, cross-linking compounds such as triallylcyanurate, triallylisocyanurate, bismaleimides or divinylbenzene, optionally after the addition of fillers, stabilizers, etc.

Copolymers prepared according to the invention which contain copolymerised groups of the above-described comonomers with reactive groups in addition to containing ethylene and acrylonitrile units may be cross-linked with other cross-linking agents. The following methods may be employed: Salt vulcanization with metal oxides such as zinc oxide, magnesium oxide or calcium oxide, which is suitable for polymers containing carboxyl groups; cross-linking with diamines or disulphides in the case of polymers containing epoxide groups and anhydride groups; cross-linking with diisocyanates if the polymers contain hydroxyl groups; cross-linking with elementary sulphur or with sulphur donors if the polymers contain double bonds or chlorine or if carbon monoxide is chemically incorporated in the polymers. Vulcanization reactions such as resin vulcanization or cross-linking with quinones are suitable as well as the cross-linking reactions mentioned above.

"Vulcanized" in the context of this invention means that less than 3% by weight, preferably less than 1% by weight, based on the copolymer, can be extracted by 10 hours' extraction in a Soxhlet attachment with toluene as extracting agent.

When mixtures with other polymers are prepared, the copolymers may be added when they have already been vulcanized but in most cases they are added in an unvulcanized form to the unvulcanized rubbers and the two components are then vulcanized together. This last embodiment may be applied to mixtures with thermoplasts such as ethylene/vinyl acetate copolymers having VA contents of from 1 to less than 30% by weight.

The copolymers prepared according to the invention may be used as such or in the form of the above-described mixtures for the preparation of vulcanized moulded articles, sheet products and coatings of all kinds, e.g. for the manufacture of tubes, seals, conveyor belts, force transmitting elements such as gear wheels and cone belts and insulating materials for insulating against sound and for damping vibrations.

The percentages given in the following Examples are percentages by weight and the parts are parts by weight.

EXAMPLES

The experiments were carried out in a continuous flow 700 ml high pressure stirrer autoclave of glandless construction designed for ideal back mixing. Tert.-amyl perpivalate was used as initiator.

The reaction parameters employed are summarized in the Table below.

|  | Example | Comparison |
| --- | --- | --- |
| Reaction pressure [bar] | 1850 |  |
| Reaction temperature [°C.] | 230 |  |
| Temperature of starting materials [°C.] | 40 |  |
| Ethylene [kg/h] | 20 |  |
| Acrylonitrile [kg/h] | 0.98 | 0.97 |
| Methacrylic acid anhydride |  |  |
| [g/h] | 20 | — |
| [ppm] | 950 | — |
| Conversion rate [%] | 14.1 |  |
| Acrylonitrile content | 30.8 | 30.5 |
| MFI [g/10 min] at 2.16 kp/190° C. | 20 | about 500 |
| Gel content | 0 | 0 |
| Tackiness | slight | strong |

We claim:

1. Ethylene/acrylonitrile copolymers having gel contents of less than 0.2% by weight, based on the copolymer and determined as insoluble residue after 24 hours' extraction with chlorobenzene in a Soxhlet extractor containing from 10 to 90% by weight of acrylonitrile incorporated by polymerisation and from 50 ppm to.2% by weight of copolymerised (meth)acryloyl compounds containing at least two acryloyl or methacryloyl groups per molecule produced by solvent-free polymerisation of the monomers by the high pressure process at pressures from 500 to 5000 bar wherein polymerisation is carried out in the presence of from 50 ppm to 2% by weight, based on the polymerisable monomers put into the process, of (meth)-acryloyl compounds containing at least two acryloyl or methacryloyl groups per molecule.

* * * * *